United States Patent [19]

Chappuis

[11] Patent Number: 5,663,218
[45] Date of Patent: Sep. 2, 1997

[54] PROTECTION FROM SHOCKS, CAPABLE OF DEFORMING PROGRESSIVELY AND IN AN IRREVERSIBLE MANNER

[75] Inventor: Jacques Chappuis, Frontonas, France

[73] Assignee: Lafarge Materiaux de Specialites, Montrouge, France

[21] Appl. No.: 685,766

[22] Filed: Jul. 24, 1996

Related U.S. Application Data

[63] Continuation of Ser. No. 295,847, filed as PCT/FR93/00214, Mar. 2, 1993, abandoned.

[30] Foreign Application Priority Data

Mar. 3, 1992 [FR] France ................... 92 02757

[51] Int. Cl.[6] .............................. C08K 9/06; C04B 14/38
[52] U.S. Cl. .................... 523/212; 524/2; 106/646; 106/655; 106/680; 106/696; 106/711; 106/713; 106/730; 106/781
[58] Field of Search ............................. 523/212; 524/2; 106/646, 655, 680, 696, 711, 713, 730, 781

[56] References Cited

U.S. PATENT DOCUMENTS

| | | | |
|---|---|---|---|
| 2,076,349 | 4/1937 | Porter et al. | 106/34 |
| 4,033,913 | 7/1977 | Sundén et al. | 524/14 |
| 4,618,370 | 10/1986 | Green et al. | 106/109 |
| 5,021,093 | 6/1991 | Beshay | 523/212 |
| 5,385,764 | 1/1995 | Andersen et al. | 428/34.4 |

FOREIGN PATENT DOCUMENTS

| | | |
|---|---|---|
| 12352 | 6/1910 | France. |
| 1051196 | 9/1953 | France. |
| 2307930 | 5/1988 | France. |
| WO86/03505 | 6/1986 | WIPO. |
| WO91/10011 | 7/1991 | WIPO. |

OTHER PUBLICATIONS

Japanese Patent Abstract corresponding to Japanese Patent No. JP–A–3000897, entitled "Production of Flame–Retardant Paper or Flame–Retardant Board," dated Jan. 7, 1991; and.

Chemical Abstract corresponding to Brazilian Patent No. BR–A–8704800, entitled "Preparation of a Silicocalcareous Mass of High Porosity Suitable for Storing Gases, Especially Dissolved Acetylene," dated May 17, 1988.

*Primary Examiner*—Mark D. Sweet
*Attorney, Agent, or Firm*—Cummings & Lockwood

[57] ABSTRACT

Process for protecting articles from shock comprising encasing such articles in a plurality of molded blocks of a composition capable of progressively and irreversibly deforming in response to such shocks, said composition comprising cellulosic fibers dispersed in a matrix of at least one non-hydrated hydraulic binder, wherein from 2.5 to 75 parts by weight of the cellulosic fibers are dispersed per 100 parts by weight of said binder, said composition, upon curing and drying, exhibiting a density between 0.15 and 0.60.

12 Claims, No Drawings

PROTECTION FROM SHOCKS, CAPABLE OF DEFORMING PROGRESSIVELY AND IN AN IRREVERSIBLE MANNER

This application is a continuation of application Ser. No. 08/295,847, filed as PCT/FR93/00214 Mar. 2, 1993, now abandoned.

The subject of the invention is a protection of articles from shocks, capable of dissipating the energy arising from shocks, without restoring this energy, in particular in the form of packaging.

In order to constitute an effective protection and therefore to prevent the object to be protected from being damaged, the protective materials must be capable of progressively absorbing the energy resulting from a shock, but not jerkily nor with abrupt rupture, this being so that the equipment to be protected is not damaged.

For example, in military applications requiring damping materials, especially during parachute drops or jettisoning, the material conventionally used is a honeycomb made of board, formed by a lattice of hexagonal cells. This material may be used in several thickness layers joined together and arranged between the parachuted equipment and the platform on which it is placed. This material has several drawbacks. When it is subjected to a high degree of moisture, it is ineffective since it has lost a large part of its mechanical properties. Moroever, when it is compressed under the effect of a shock, collapse of the boarded walls of the honeycomb occurs, which leads, depending on the case, to either an abrupt or a jerked reduction in the compressive strength. The trading-in of a honeycomb, which consequently does not take place in a progressive way, leads to abrupt variations in the deceleration. As a result, the equipment to be protected is subjected to shaking which risks damaging it.

Other materials have already been proposed for producing shock-protective packaging.

Among the most well known, mention may be made of polystyrene. However, this is not biodegradable and, under the action of heat or when it is burning, it may release toxic substances. Now, after use, most packaging materials are thrown away with household waste which is often subjected to incineration treatments.

Fibre-reinforced foam or cellular bodies are also known.

The bodies described in the European Patent 242,361 are obtained by adding, to a dispersion of fibres which may be cellulosic fibres, several organic agents, a first one in order to lower the surface tension, a second one in order to produce the expansion and, finally, one or more viscosity-increasing polymers which are soluble or capable of swelling greatly. As a result of the presence of organic substances in significant amount, since a voluminous foam body is desired, the toxicity and pollution problems, mentioned hereinabove for polystyrene, are again encountered.

Furthermore, these cellular or foam bodies are expensive since they require the use of non-negligible quantities of expensive raw materials.

The principal objective of the invention is effective protections from shocks, which do not have the aforementioned drawbacks of the prior art.

That is to say, a protection against shocks is sought, which is capable of deforming progressively and in an irreversible manner, and which furthermore is, at the same time:

inexpensive, respectful of the environment and non-toxic, effective for violent shocks, effective when it is employed by way of prevention against impacts, for example in packaging, and easy to realize by moulding.

In general, the invention therefore relates to a novel protection of articles from shocks, capable of deforming progressively and in an irreversible manner, characterized in that this protection is made from a material which comprises, for 100 parts by weight of at least one non-hydrated hydraulic binder, from 2.5 to 75 parts by weight of cellulosic fibres dispersed in the matrix resulting from the setting and curing of a hydraulic binder or binders, and in that the material, once dried has a density of between 0.15 and 0.60.

It has been discovered, in fact, that lightweight and fibrous materials in accordance with the invention, under the effect of compression, generate a virtually constant, or slightly increasing, resisting stress progressively as they cave in and this is the case until their thickness is reduced by a factor of 2 or more. When the really interesting compression behaviour of these materials is plotted, it may be seen that, in compression, these materials have a load/deformation curve which, after a small elastic region for very small compressive strains (of the order of from 1% to 2%), exhibits a straight line of gentle slope, which then has an upward inflection, and which finally increases more significantly for compressive strains always above half the initial thickness of the specimen. In other words, the materials according to the invention may absorb the kinetic energy of a moving object progressively as they deform, but without ever yielding abruptly or jerkily. This is why, under the effect of a shock, by virtue of the protection according to the invention, a few impacts, or even not one single impact, have an effect on the equipment to be protected. This results from the plastic (therefore irreversible) and particularly special deformability of the materials according to the invention. These materials are therefore very different from elastic bodies, which develop a resisting stress proportional to the deformation and restore the stored energy when the load stops.

Advantageously, the protections according to the invention are made from an isotropic material. Thus, this has the advantage of equivalent behaviour in all directions. In fact, because of its homogeneity, compressive strain is balanced when it is uniformly distributed. In other words, when the shock-resistant material is isotropic, preferential compressive strain does not occur in certain, more sensitive, zones which could cause tilting of the equipment to be protected or cause impacts on the equipment to be protected.

In accordance with a preferred embodiment of the invention, the material for the manufacture of effective protection from shocks comprises, for 100 parts by weight of at least one hydraulic binder, 5 to 50 parts by weight of cellulosic fibres dispersed in the matrix resulting from the setting and curing of the hydraulic binder or binders, and, once dried, has a density of between 0.15 and 0.60.

In accordance with a further preferred embodiment of the invention, the material for the manufacture of effective protection against shocks comprises, for 100 parts by weight of at least one hydraulic binder, 10 to 25 parts by weight of cellulosic fibres dispersed in the matrix resulting from the setting and curing of the hydraulic binder or binders, and, once dried, has a density from between 0.2 and 0.4.

By varying the physico-chemical characteristics of the materials of the protections according to the invention (nature of the hydraulic binder, fibre content and density), a range of products is obtained which have very variable levels of compressive-strength plateaux, generally between 0.1 and 4 MPa. The dimensions of these products will be able to be optimized as a function of the energy which they will be able to bring to be dissipated in the course of their crushing. By means of this selection (nature of the binder, fibre content, density, surface area and height of the protective component), the invention makes it possible to manufacture protections having the compressive strength appropriate to the specific application for which they are intended.

As hydraulic binder, cement may be used, such as Portland cement, high-alumina cements, or gypsum.

In accordance with the invention, the useful materials for producing protections from shocks are reinforced with cellulosic fibres which confer good cohesion on them.

Optionally, agents are incorporated into the composition serving for the preparation of materials according to the invention, in order to confer on them a special quality. In this regard, the addition of water-repellant agents may be provided in order to improve their moisture resistance. In fact, under severe conditions, for example when immersed under water, their porosity may be impregnated with water, thereby modifying their compression behaviour. However, it should be noted that, after drying, the materials of the protections according to the invention recover their compression characteristics.

In order to prevent them from being impregnated with water, their moisture resistance may be improved simply with the aid of a water-repellancy treatment, for example by means of a bulk treatment with salts of fatty acids or silicones, or by a surface treatment with silicones. Other treatments aiming to render the material impermeable, for example by dipping into cement slurries or by the addition of a paint, varnish, etc., may also be carried out.

The cellulosic fibres suitable for the invention may be of any origin. For economical reasons, cellulosic fibres coming from the recovery of waste paper are preferentially chosen. In association with the cellulose fibres, other fibres may also be used, for example inorganic fibres such as glass fibres, or organic polymeric fibres.

In order to produce lightened materials (of density less than 0.20 for example), foaming agents may be incorporated into their preparation.

Above 30 g of cellulose per liter of water, it is not necessary to add agents making it possible to prevent sedimentation (or thickeners) since the pulps are generally sufficiently thickening to prevent bleeding or sedimentation phenomena. Nevertheless, these phenomena may be even more strongly resisted by further stabilizing the mixture before the setting of the cement by virtue of thickeners such as, for example:

cellulosic ethers, such as carboxymethyl cellulose, carboxymethyl starch, methylhydroxy-ethyl cellulose or methylhydroxypropyl cellulose, polysaccharides such as guar gums or xanthan gums, polyacrylamides, thickening fillers such as swelling clays or ultrafine powders, such as aerosils for example, etc.

One advantage of the protections according to the invention resides in their cost. They are, in fact, manufactured from cheap raw materials and their preparation, over and above its simplicity, does not involve a very high energy cost since the latter essentially corresponds to the drying of the material.

Moreover, the protections according to the invention have other advantages:

the protections according to the invention, which consist of non-polluting raw materials, respect the environment. In fact, it is very well understood from the above description that the protections according to the invention are essentially for use just once. After use, they may be discharged without restriction or be subjected to incineration treatments, without production of gases harmful to the environment, since their formulations generally do not contain organic matter likely to be harmful and when they do comprise them, they are in very small amounts.

The protections according to the invention possess excellent fire behaviour: in fact, they are non-inflammable and are classed M0.

Finally, they are good thermal insulators since they have a coefficient of thermal conductivity of between 0.05 and 0.14 J/m.K.s. The combination of the shock-absorbing, fire-resistant and thermal-insulation properties is particularly favourable for applications of the packaging of munitions for which it is generally desired that, in the event of an accidental explosion of a container, the munitions contained in neighbouring containers remain intact.

The materials serving to manufacture the protections according to the invention preferentially come from a stock obtained by mixing thick pulps of cellulosic fibres in water with at least one hydraulic binder.

One preferred embodiment of the process for manufacturing these materials consists in preparing a pulp, for example by disintegration, in water, of waste paper with the aid of a pulper. Quite a thick pulp is thus obtained which may contain between 10 g and 60 g of cellulosic fibres per liter of water and preferably between 20 g/l and 50 g/l. Next, the binder is added to a greater or lesser extent depending on the density desired for the final product. It may be mixed with the pulp using the same type of agitator as the one employed for making up the pulp or a less powerful agitator. Next, the stock obtained is poured out into moulds having the dimensions of the final product and the stock is levelled off.

After the binder has set, the product is demoulded, for example by stripping away the side walls of the mould, and the product obtained is dried, preferably in a ventilated oven or a dryer, the temperature of which depends on the binder used. Drying is stopped when the specimen has reached a constant weight.

By virtue of this process it is therefore possible to make blocks of various dimensions and especially of thickness and of surface area which are suitable for ensuring progressive and effective damping of the shocks likely to arise. These damper blocks may comprise several parts of different density simply by combining materials according to the invention which have various densities.

The dampers according to the invention may be provided for encasing, partially or completely, the equipment which must not be subjected to impact, since otherwise there would be the risk of it being damaged. This is why the protections according to the invention are particularly well placed in order to protect delicate equipment (domestic electrical appliances, Hi-fi equipment, etc.), either in the form of complete packaging or alternatively of corner wedges or of sheets useful for separating the delicate equipment from the external packaging, but especially in order to receive and absorb the energy of possible shocks.

Other operating parameters and details will appear in the description which follows, relating to illustrative and non-limiting examples of the invention.

EXAMPLES 1 to 10

The protections described in Examples 1 to 10 are prepared in the following manner:

1) Preparation of the suspension of cellulose fibres:

This suspension is obtained by pulping, by agitating a mixture of water and waste paper, for example waste newsprint. It may also be imagined to use fibres obtained via a paper-making route. In our products, the best results are obtained for a concentration of from 20 g/l to 50 g/l of fibres. In the formulations containing an anti-sedimentation agent, methylhydroxypropyl cellulose was used, which was added to the suspension of fibres. This product behaves as a water-retaining thickener.

2) Addition of hydraulic binder to the suspension 1):

The hydraulic binder may be gypsum, high-alumina cement or Portland cement.

The mixture is obtained by agitating, in this case with the aid of a paddle agitator.

The mass of binder added is such that the final density of the product is between 0.15 and 0.6.

3) Casting the stock obtained into a mould.

4) Setting and curing at ambient temperature for:
a few hours for gypsum,
one day for high-alumina cements,
24 hours at 20° C. and then 48 hours at 70° C. and 100% relative humidity for Portland cements.

5) Demoulding.

6) Oven drying at 45° C.

The other specific operating conditions for each example are given in the following table:

| No. | BINDER (g) | Cellulosic fibres (g) | Water (g) | Density |
|---|---|---|---|---|
| 1 | Portland cement (a) 238.6 | 59.65 (F/P = 25) | 1171.15 | 0.27 |
| 2 | Portland cement (a) 279.4 | 55.85 (F/P = 20) | 1164.8 | 0.32 |
| 3 | Portland cement (a) 360.8 | 54.12 (F/P = 15) | 1201.75 | 0.41 |
| 4 | High-alumina cement (b) 1500 (LiCO$_3$:7 g) | 225 (F/P = 15) | 6000 | 0.4 |
| 5 (c) | Gypsum 450 | 235 (F/P = 52.2) | 5280 | 0.19 |
| 6 (a) | Gypsum 1100 | 294 (F/P/ = 26.7) | 6600 | 0.24 |
| 7 (e) | Portland cement (a) 386.6 | 38.66 (F/P = 10) | 1157 | 0.38 |
| 8 (f) | Gypsum 261.4 | 26.14 (F/P = 10) | 710.7 | 0.4 |
| 9 | Portland cement (a) 800 | 120 (F/P = 15) | 3844 | 0.179 |
| 10 (g) | Gypsum 1600 | 80 (F/P = 5) | 2900 | 0.539 |

(a) This is a CPA 55 Portland cement.
(b) This is a high-alumina cement having the commercial name SECAR 71, marketed by LAFARGE FONDU INTERNATIONAL.
(c) The formulation useful for manufacturing this material also comprises 44 g of glass fibres.
(d) The formulation useful for manufacturing this material also comprises 55 g of glass fibres.
(e) The formulation useful for manufacturing this material also comprises 2.7 g of methylhydroxypropyl cellulose.
(f) The formulation useful for manufacturing this material also comprises 1.7 g of methylhydroxypropyl cellulose.
(g) The formulation useful for manufacturing this protection also comprises 12 g of methylhydroxypropyl cellulose and 4 g of a foaming agent. This product has been foamed by agitation for 60 minutes in a rotating earthenware jar in the presence of a charge of 750 g of alumina balls.

In the following table, the compressive strength of the materials exemplified is given as a function of the compressive strain which is produced at relatively low rates.

The compressive strain, which is expressed as a percentage, is equal to 100 (Ho-H)/Ho, Ho being the initial height of the specimen tested and H its height during the compression test. The dimensions of the specimens tested are, for the cut-out blocks, approximately 50 mm×50 mm×80 mm.

In this table, the compressive strength is expressed in MPa (1 MPa=10 bar).

| Example No. | Compressive strength as a function of the compressive strain experienced by the specimen | | | |
|---|---|---|---|---|
| | 12.5% | 25% | 37.5% | 50% |
| 1 | 0.33 | 0.41 | 0.66 | 1.21 |
| 2 | 0.47 | 0.72 | 1.05 | 2.04 |
| 3 | 0.82 | 1.25 | 1.96 | 3.48 |
| 4 | 0.75 | 0.86 | 1.07 | 1.81 |
| 5 | 0.14 | 0.17 | 0.21 | 0.31 |
| 6 | 0.19 | 0.21 | 0.26 | 0.37 |
| 7 | 0.56 | 0.83 | 1.28 | 2.53 |
| 8 | 0.32 | 0.41 | 0.58 | 1.06 |
| 9 | 0.10 | 0.15 | 0.20 | 0.32 |
| 10 | 1.17 | 1.42 | 1.90 | 3.02 |

I claim:

1. Process for protecting articles from shock comprising partially or totally encasing such articles in one or a plurality of molded blocks of a composition having a load/deformation curve which, after a small elastic region, is followed by a region corresponding to a progressive and irreversible deformation, said composition comprising cellulosic fibers dispersed in a matrix of at least one non-hydrated hydraulic binder, wherein from 2.5 to 75 parts by weight of the cellulosic fibers are dispersed per 100 parts by weight of said binder, said composition, upon curing and drying, exhibiting a density between 0.15 and 0.60.

2. Process as defined in claim 1 wherein from 5 to 50 parts by weight of the cellulosic fibers are dispersed per 100 parts by weight of said binder.

3. Process as defined in claim 1 wherein from 10 to 25 parts by weight of the cellulosic fibers are dispersed per 100 parts by weight of said binder, said composition, upon curing and drying, exhibiting a density between 0.2 and 0.4.

4. Process as defined in claim 1 wherein said hydraulic binder is a member selected from the group consisting of Portland cement, high-alumina cements, gypsum, and mixtures thereof.

5. Process as defined in claim 1 wherein the dispersion of cellulosic fibers in a matrix of at least one non-hydrated hydraulic binder is treated with a water repellant agent.

6. Process as defined in claim 5 wherein said water repellant agent is a member selected from the group consisting of salts of fatty acids, silicones, and mixtures thereof.

7. Process as defined in claim 1 wherein the cellulosic fibers are additionally associated with inorganic fibers, organic polymeric fibers, and mixtures thereof.

8. Process as defined in claim 1 wherein the dispersion of cellulosic fibers in a matrix of at least one non-hydrated hydraulic binder is additionally admixed with a foaming agent.

9. Process as defined in claim 1 wherein a thickener is additionally added to the dispersion of cellulosic fibers in a matrix of at least one non-hydrated hydraulic binder to prevent sedimentation.

10. Process as defined in claim 9 wherein the thickeners are members selected from the group consisting of cellulosic ethers, polysaccharrides, polyacrylamides, swelling clays, ultrafine powders, and mixtures thereof.

11. Processes defined in claim 1 wherein said composition is made from an isotropic material.

12. Process as defined in claim 1 wherein said articles are totally or partially encased in at least two layers of said composition, each of said layers having a density different from the other.

* * * * *